US009245346B2

(12) United States Patent
Bartmann et al.

(10) Patent No.: US 9,245,346 B2
(45) Date of Patent: *Jan. 26, 2016

(54) REGISTERING OF A SCENE DISINTEGRATING INTO CLUSTERS WITH PAIRS OF SCANS

(71) Applicant: FARO Technologies, Inc., Lake Mary, FL (US)

(72) Inventors: Sebastian Bartmann, Stuttgart (DE); Helmut Kramer, Mainbernheim (DE); Daniel Pompe, Stuttgart (DE); Michael Schanz, Gerlingen (DE)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/671,387

(22) Filed: Mar. 27, 2015

(65) Prior Publication Data

US 2015/0287207 A1 Oct. 8, 2015

(30) Foreign Application Priority Data

Apr. 2, 2014 (DE) ...................... 10 2014 104 713 U (51) Int. Cl.
*G06K 9/00* (2006.01)
*G06T 7/00* (2006.01)
*G06K 9/62* (2006.01)

(52) U.S. Cl.
CPC ............ *G06T 7/0075* (2013.01); *G06K 9/6218* (2013.01); *G06T 7/0024* (2013.01); *G06T 2207/10028* (2013.01)

(58) Field of Classification Search
None
See application file for complete search history.

(56) References Cited

U.S. PATENT DOCUMENTS

| 7,453,459 | B2 * | 11/2008 | Shekter ................. G06T 15/005 |
| | | | 345/423 |
| 8,013,983 | B2 | 9/2011 | Lin et al. |
| 2006/0188143 | A1 | 8/2006 | Strassenburg-Kleciak |
| 2008/0310757 | A1 * | 12/2008 | Wolberg ............ G06K 9/00208 |
| | | | 382/285 |
| 2009/0232388 | A1 | 9/2009 | Minear et al. |
| 2012/0069352 | A1 | 3/2012 | Ossig et al. |

(Continued)

FOREIGN PATENT DOCUMENTS

| DE | 102009015922 A1 | 10/2010 |
| DE | 202010013825 U1 | 2/2011 |
| EP | 2682783 A1 | 1/2014 |

OTHER PUBLICATIONS

Bornaz, Leandro et al., "Multiple Scan Registration in Lidar Close-Range Applications"; The International Archives of the Photogrammetry, Remote Sensing and Spatial Information Sciences, vol. XXXIV, Part 5/W12; 2003; pp. 72-77; 6 pages.

(Continued)

*Primary Examiner* — Shervin Nakhjavan
(74) *Attorney, Agent, or Firm* — Cantor Colburn LLP (57) ABSTRACT

A method for optically scanning and measuring a scene by a three-dimensional (3D) measurement device in which multiple scans are generated to then be registered in a joint coordinate system of the scene. At first at least one cluster is generated from at least one scan, further scans are registered for test purposes in the coordinate system of the cluster, and registering is then confirmed if specified quality criteria are fulfilled and the generated clusters are then joined, for which purpose pairs are formed of selected scans and/or clusters to form pairs, the pairs are registered for test purposes and registering is confirmed if appropriate.

10 Claims, 5 Drawing Sheets

(56) References Cited

U.S. PATENT DOCUMENTS

| | | |
|---|---|---|
| 2012/0140202 A1 | 6/2012 | Rothenberger |
| 2013/0054187 A1* | 2/2013 | Pochiraju .................. G01C 3/08 702/150 |
| 2015/0285913 A1* | 10/2015 | Becker .................. G01S 7/4817 356/5.04 |

OTHER PUBLICATIONS

German Office Action for Application No. 10 2014 104 712.5 mailed Mar. 12, 2015, 8 pages.

English Translation of German Office Action for Application No. 10 2014 104 712.5 mailed Mar. 12, 2015, 4 pages.

English Translation of German Office Action for Application No. 10 2014 104 713.3 mailed Mar. 13, 2015, 3 pages.

Errington, Angus et al., "Closure Monitoring in Potash Mines Using LiDAR". In: IECON 2010—36th Annual Conference on IEEE Industrial Electronics Society, 2010, S. 2823-2827, 5 pages.

German Office Action for Application No. 10 2014 104 713.3 mailed Mar. 13, 2015, 7 pages.

International Search Report and Written Opinion for Application No. PCT/US2015/023237 dated Jul. 29, 2015.

Zhou, H., et al., "Accurate integration of multi-view range images using k-means clustering" Pattern Recognition, Elsevier, GB, vol. 41, No. 1, Aug. 23, 2007, pp. 152-175, XP022208716.

\* cited by examiner

REGISTERING OF A SCENE DISINTEGRATING INTO CLUSTERS WITH PAIRS OF SCANS

CROSS REFERENCE TO RELATED APPLICATIONS

The present application claims the benefit of German Patent Application No. DE102014104713.3, filed on Apr. 2, 2014, the contents of which are hereby incorporated by reference.

FIELD OF THE INVENTION

The invention relates to a method for optically scanning and measuring a scene using a laser scanner.

BACKGROUND OF THE INVENTION

German Published Patent Application No. DE102009015922A1 describes a method for optically scanning and measuring a scene using a laser scanner, in which a scene is registered with multiple scans. For this purpose, the laser scanner is taken to a new location after a scan to generate an additional scan. The generated scans with their measuring points are registered in a joint coordinate system, wherein the entity of measuring points forms a three-dimensional (3D) point cloud.

Through use of known methods for registering multiple scans of a scene, the registering process, which may be based on the pairwise examination of two scans, should theoretically be unambiguous and may take place completely automatically. In practice, however, for reasons of performance, not all scans are typically examined pairwise, but usually only within a neighborhood that results, for example, from the history of registering of the scene. This is why interruptions in the registering process may occur.

Embodiments of the present invention are based on improving a method of the type mentioned hereinabove.

SUMMARY OF THE INVENTION

According to embodiments of the present invention, at first at least one cluster is generated from at least one scan, to which further scans are added, as long as specified quality criteria are fulfilled. Otherwise, a new cluster is generated. When auto clustering has taken place, the clusters are joined. For this purpose, the clusters and/or scans must be selected pairwise and be registered for test purposes.

The selection of the clusters and/or scans for joining the clusters can take place in different ways. As long as the scans in their entity get sufficient information, strategies are possible which permit an automatic joining of the clusters with a good performance, particularly if strategies are pursued already when clustering. Cumulatively (i.e., for additionally supporting and accelerating) or alternatively (in particular if the information gathered from the scans is in its entity not sufficient or if it is ambiguous), interventions by the user can take place. In case of a post registration, these interventions can be, for example, supports in selecting the pairs, and in case of an onsite registration then additional scans. In all cases, confirmations by the user can be requested after the proposed joining to a cluster.

BRIEF DESCRIPTION OF THE DRAWINGS

The invention is explained in more detail below on the basis of exemplary embodiments illustrated in the drawings, in which.

DETAILED DESCRIPTION OF THE INVENTION

Figure 5:
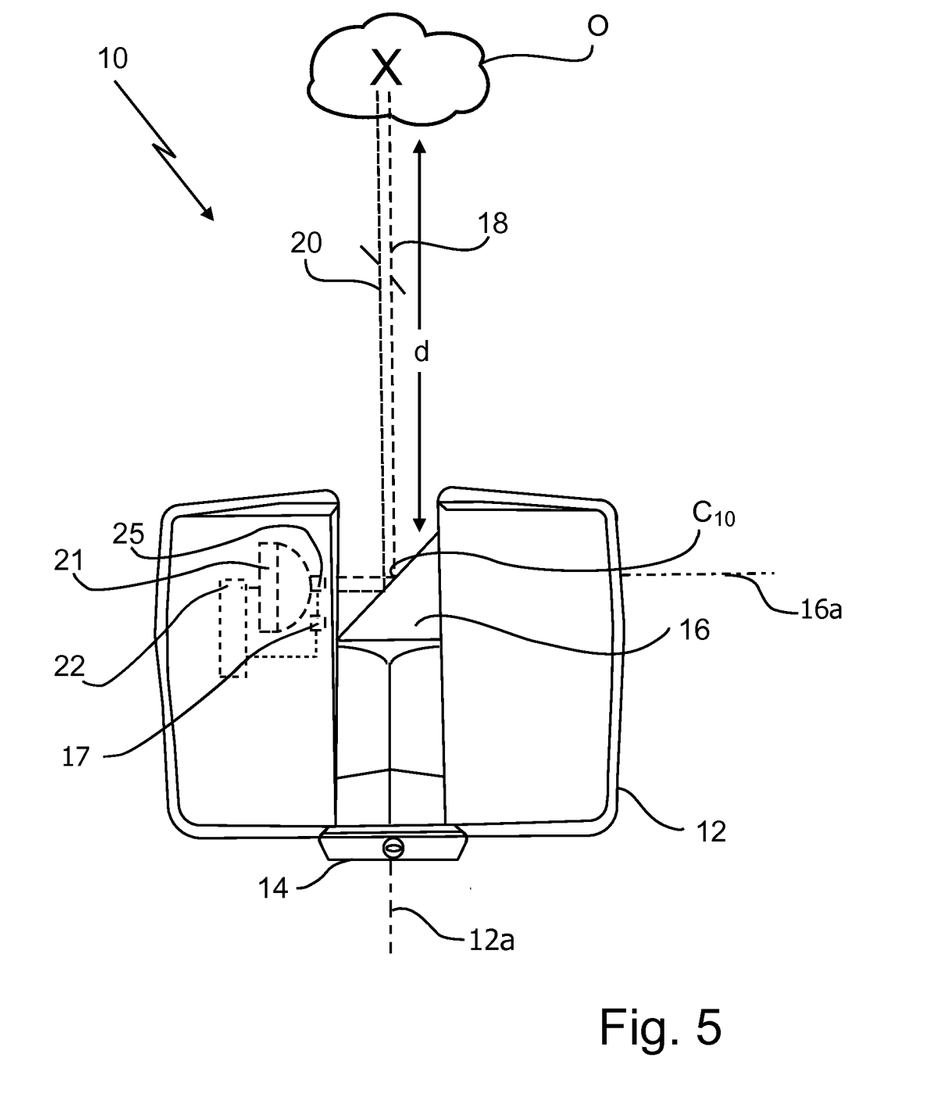
FIG. 5 is a schematic, partially cut representation of a laser scanner in operation.
Figure 6:
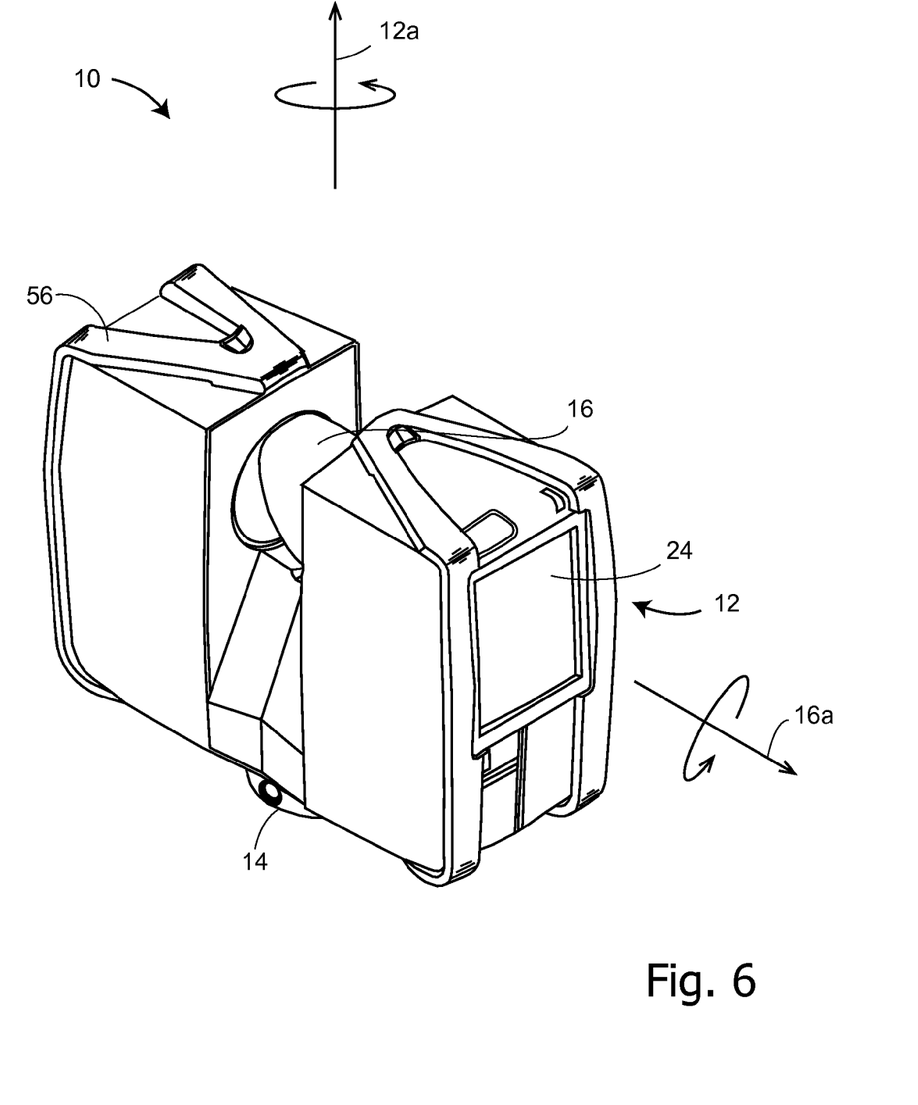
FIG. 6 is a perspective view of the laser scanner of FIG. 5.

Referring to FIGS. 5 and 6, embodiments of the present invention relate to a 3D coordinate measurement device which steers a beam of light to an object O, which may either be a cooperative target such as a retroreflector or a non-cooperative target such as a diffusely scattering surface of the object O. A distance meter in the device measures a distance to the object O, and angular encoders measure the angles of rotation of two axles in the device. The measured distance and the two angles enable a processor in the device to determine the 3D coordinates of the object O. Embodiments of the present invention disclose a laser scanner 10 as the 3D coordinate measurement device, but various other embodiments utilizing a laser tracker or total station should be clear to one of ordinary skill in the art. The 3D measurement device may also be a portable freestyle device with a projector generating a light pattern (e.g., infrared light pattern) onto the object O and one or more cameras capturing the light pattern on the object O.

Laser scanners are typically used for scanning closed or open spaces such as interior areas of buildings, industrial installations and tunnels. Laser scanners are used for many purposes, including, for example, building information modeling (BIM), industrial analysis, accident reconstruction applications, archaeological studies, and forensics investigations. A laser scanner can be used to optically scan and measure objects in a volume around the laser scanner through the acquisition of data points representing objects within the volume. Such data points are obtained by transmitting a beam of light onto the objects and collecting the reflected or scattered light to determine the distance, two-angles (i.e., an azimuth angle and a zenith angle), and optionally a gray-scale value. This raw scan data is collected, stored and sent to a processor or processors to generate a 3D image representing the scanned area or object. To generate the image, at least three values are collected for each data point. These three values may include the distance and two angles, or may be transformed values, such as x, y, z coordinates.

In FIGS. 5 and 6, a laser scanner 10 is shown for optically scanning and measuring the environment surrounding the laser scanner 10. The laser scanner 10 comprises a measuring head 12 and a base 14. The measuring head 12 is mounted on the base 14 such that the measuring head 12 can rotate with respect to the base 14 about a first axis 12a, driven by a first rotary drive. The rotation about the first axis 12a may be about the center of the base 14. The measuring head 12 comprises a mirror 16, which can rotate about a second axis 16a, driven by a second rotary drive. Referring to a normal upright position of the laser 10, the first axis 12a may be called the vertical axis or azimuth axis, while the second axis 16a may be called the horizontal axis or zenith axis. The laser scanner 10 may comprise a gimbal point or center $C_{10}$ that is the intersection point of the first axis 12a and the second axis 16a.

The measuring head 12 is further provided with an electromagnetic radiation emitter, such as light emitter 17, for example, that emits an emission light beam 18. In an embodiment, the emission light beam 18 is a coherent light such as a laser beam. The laser beam may have a wavelength range of approximately 300 to 1600 nanometers, for example 790 nanometers, 905 nanometers, 1550 nanometers, or less than 400 nanometers. It should be appreciated that other electromagnetic radiation beams having greater or smaller wavelengths may also be used. The emission light beam 18 may be amplitude or intensity modulated, for example, with a sinusoidal waveform or with a rectangular waveform. Alternatively, the emission light beam 18 may be otherwise modulated, for example, with a chirp signal, or coherent receiver methods may be used. In the present embodiment, the emission light beam 18 is a continuous wave laser beam. However, it may also be a pulsed laser. The emission light beam 18 is emitted by the light emitter 17 onto the mirror 16, where it is deflected to the environment of the laser scanner 10.

A reflected light beam, hereinafter called a reception light beam 20, is reflected from the environment by an object O. The reflected or scattered light is intercepted by the rotary mirror 16 and directed onto a light receiver 21 with reception optics. The directions of the emission light beam 18 and the reception light beam 20 result from the angular positions of the measuring head 12 and the mirror 16 about the axes 12a and 16a, respectively. These angular positions in turn depend on the corresponding rotary drives. The angle of rotation about the first axis 12a is measured by a first angular encoder. The angle of rotation about the second axis 16a is measured by a second angular encoder.

A control and evaluation unit 22 has a data connection with the light emitter 17 and the light receiver 21 inside the measuring head 12, whereby parts of the control and evaluation unit 22 can be arranged also outside the measuring head 12, for example as a computer connected to the base 14. The control and evaluation unit 22 is configured to determine, for a multitude of measuring points X, a corresponding number of distances d between the laser scanner 10 and the measuring points X on object O. The distance to a particular measuring point X is determined based at least in part on the speed of light in air through which electromagnetic radiation propagates from the device 10 to the measuring point X. In an embodiment, the phase shift in the modulated light beam 18, 20, sent to the measuring point X and received from it, is determined and evaluated to obtain a measured distance d.

The speed of light in air depends on the properties of the air such as the air temperature, barometric pressure, relative humidity, and concentration of carbon dioxide. Such air properties influence the index of refraction of the air. The speed of light in air is equal to the speed of light in vacuum divided by the index of refraction. A laser scanner of the type discussed herein is based on the time-of-flight of the light in the air (the round-trip time for the light to travel from the device to the object and back to the device). A method of measuring distance based on the time-of-flight of light (or the time-of-flight of any type of electromagnetic radiation) depends on the speed of light in air and is therefore easily distinguished from methods of measuring distance based on triangulation. Triangulation-based methods involve projecting light from a light source along a particular direction and then intercepting the light on a camera pixel along a particular direction. By knowing the distance between the camera and the projector and by matching a projected angle with a received angle, the method of triangulation enables the distance to the object to be determined based on known length and two known angles of a triangle. The method of triangulation, therefore, does not directly depend on the speed of light in air.

The measuring head 12 may include a display device 24 integrated into the laser scanner 10. The display device 24 includes a user interface, which may be a graphical touch screen, as shown in FIG. 6. For example, the display device 24 may have a user interface that allows the operator to provide measurement instructions to the laser scanner 10, in particular to set the parameters or initiate the operation of the laser scanner 10, and the display device 24 may also display measurement results.

In an embodiment, the scanning of the environment of the laser scanner 10 takes place by rotating the mirror 16 relatively quickly about the second axis 16a while rotating the measuring head 12 relatively slowly about the first axis 12a, thereby moving the assembly in a spiral pattern. In an exemplary embodiment, the rotary mirror 16 rotates at a maximum speed of 5820 revolutions per minute. A scan is defined to be the entity of measuring points X in such a measuring. For such a scan, the center $C_{10}$ defines the origin of the local stationary reference system. The base 14 rests in this local stationary reference system.

In addition to measuring a distance d from the center $C_{10}$ to a measuring point X on the object O, the laser scanner 10 may also collect gray-scale values related to the received optical power. The gray-scale value may be determined, for example, by integration of the bandpass-filtered and amplified signal in the light receiver 21 over a measuring period attributed to the measuring point X. Optionally, color images can be generated by a color camera 25. Through use of these color images, colors (R, G, B) can be assigned to the measuring points X as additional values.

To scan a scene from different directions or a large space, multiple scans are captured from different locations (corresponding to an amount of different centers) and then registered in a joint coordinate system XYZ of the scene. The laser scanner 10 must change its location for this purpose, thus moving each time the center $C_{10}$ of the laser scanner 10 within the joint coordinate system XYZ to a new center from the amount.

For registering the scans, point-based methods or methods using targets can be used. In an exemplary embodiment, registering is performed through use of targets. The targets are localized and identified in overlapping areas of the scans. Both, "natural" targets, i.e., certain formations of the object O, and "artificial" targets, i.e., targets which have been applied especially for the scanning process to the object O or to the environment, for example checker-board patterns, are appropriate as targets. The geometry in which a target is embedded and which is defined by the adjacent targets, is determined for each target, for example as described in the aforementioned German Published Patent Application No. DE102009015922A1. The embedding geometries can then be compared with each other to first automatically find corresponding pairs of targets and then find the best possible assignment of the two scans. When all scans are registered in the joint coordinate system XYZ, the entity of all measuring points X of all scans forms a three-dimensional point cloud 3DP.

It is usually possible to register all scans through use of the targets, even without having additional information on the relative positions of the centers of the scans. To improve performance, the time stamp of the scans can be used to find and register adjacent scans faster. The result of registering can be shown on the display unit 24. A confirmation by the user is optional.

It is, however, also possible that problems occur during registering, for example not enough targets in overlapping areas of the scans, ambiguous, embedding geometries or a difficult topology. It is also possible that problems are present which are not recognized immediately, but only by the user. Therefore, auto clusters can be generated which comprise unambiguously matching scans. For defining such unambiguous matching, specified quality criteria can be defined which must be fulfilled. Such a quality criterion can be, for example, a threshold value for the remaining inverse squares of the targets, after the embedding geometries have been assigned, wherein the quality criterion shall increase with increasing concordance.

Figure 1:
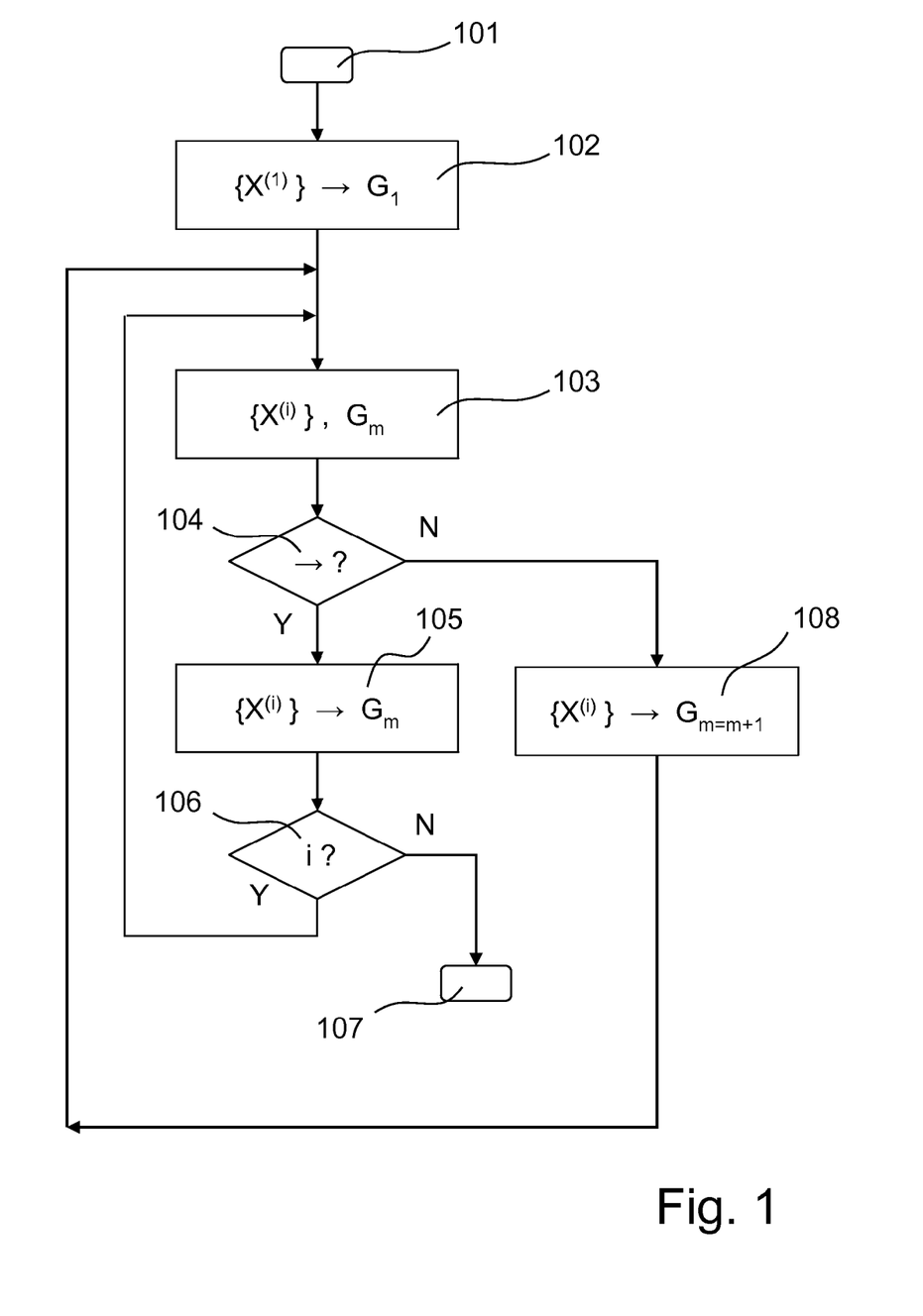
FIG. 1 is a schematic flow diagram of a method of automatic clustering.

In FIG. 1, a schematic representation of the procedure during "auto-clustering" shows how it can be automatically carried out, for example, through use of a suitable filtering device. After an initial step 101, a first cluster $G_1$ is defined in a processing step 102, and the first scan $\{X^{(1)}\}$—initially as the only scan—is assigned to it (shown by an arrow). This first scan $\{X^{(1)}\}$ also defines the coordinate system of the first cluster $G_1$. For a following loop which processes a cluster $G_m$ during every cycle, therefore, during the first cycle, m=1. The further scans $\{X^{(i)}\}$ start with i=2.

The loop then starts, the loop containing a processing step 103 in which a further scan $\{X^{(i)}\}$ is registered for test purposes in the coordinate system of the cluster $G_m$ which is processed at present. The cluster $G_m$ can contain a relatively large quantity of targets. There are two possibilities. Either, for reasons of performance, a pair is formed, for example, from the last successfully registered scan (or another scan) of the cluster $G_m$ and the further scan $\{X^{(i)}\}$. Or, for reasons of improved success in registering, the pair is formed from the cluster $G_m$ (complete cluster $G_m$ or peripheral portion composed of several scans) and the further scan $\{X^{(i)}\}$. The expression "peripheral portion" should paraphrase that the cluster $G_m$ is composed of many scans overlapping with their respective neighbors, and it is rather probable that a further scan $\{X^{(i)}\}$ is not overlapping with registered scans in the center of the cluster $G_m$ but with (several) registered scans in the periphery of the cluster $G_m$, wherein the common targets in the overlapping parts of the scans are used for registering the scans. In particular, the number of common targets in the peripheral portion of the cluster $G_m$, formed of several scans, is larger than the number of targets of a single scan of the cluster $G_m$, thus increasing the probability for a success in registering the further scans $\{X^{(i)}\}$. The pair is registered for test purposes.

A decision process 104 checks whether registering has been successful, i.e., whether the quality criteria for registering are fulfilled. If this is the case (Y), registering is confirmed (by the procedure) in a processing step 105, otherwise (N), registering for test purposes is rejected.

A subsequent decision step 106 checks whether further scans $\{X^{(i)}\}$ are available, which have not yet been registered for test purposes in this loop ("free scans"). Such a check usually will take place by an incrementing loop counter (e.g., number "I" of the scan) and of appropriate flags. If such free scans $\{X^{(i)}\}$ are still available (Y), the loop jumps back to processing step 103 with registering for test purposes. The decision step 106 could take place also at the beginning of the loop. If no free scans $\{X^{(i)}\}$ are available any longer, auto-clustering ends with a final step 107.

If registering for test purposes is rejected after the decision step 104, a new cluster $G_m$ (with m=m+1) is defined in a processing step 108, and the last scan $\{X^{(i)}\}$ registered for test purposes, is assigned to this new cluster $G_m$. This last-named scan $\{X^{(i)}\}$ defines the coordinate system of the new cluster $G_m$. The procedure is then continued with processing step 103 of the registering for test purposes.

In a modified embodiment, a new cluster is not immediately started in case of an unsuccessful registering for test purposes, but a specified number of the next free scans $\{X^{(i)}\}$ is tested instead for assigning to the present cluster $G_m$. With a view to performance, it is appropriate to limit the number of these scans still to be tested, by defining a limit, for example by the time stamp or the continuous number of the scan, i.e., a limit with respect to space and/or time, so that it is only tried to register scans which are adjacent with respect to time (and consequently usually also with respect to space) for test purposes. This reduces time consumption or the complexity of registering.

In an alternative to the described serial procedure, the scans $\{X^{(i)}\}$ can be tested pairwise, in a more parallel method (corresponding to the crystal growth), for registering for test purposes. From each matching pair, a cluster $G_m$ is formed as a nucleation site. From the clusters $G_m$ or from single scans from the clusters $G_m$ and the free scans $\{X^{(i)}\}$, new pairs arise, which again are checked for being registered for test purposes, until, in the end, no further registering is successful.

In the case of a building, the clusters $G_m$ frequently comprise adjacent scans $\{X^{(i)}\}$ of the same room, the same floor, the same building or from its interior and exterior.

The problem remains to join the clusters $G_m$, for example on an appropriate registering device. It must thereby be taken into account (as in processing step 103) that the clusters $G_m$ contain a relatively large amount of targets. For reasons of performance, when forming the pairs, single scans $\{X^{(i)}\}$ may be selected from the clusters $G_m$. However, for increasing the success of registering for test purposes, and in particular if pairs of single scans $\{X^{(i)}\}$ were used in step 103, it is better to use whole clusters $G_m$ or peripheral portions thereof. Either a single scan $\{X^{(i)}\}$ is selected from a first cluster $G_m$, and the second cluster $G_l$ is used as a whole or in a peripheral portion. Or the pairs are formed by two clusters $G_m$, $G_l$ and/or peripheral portions thereof Such a scan $\{X^{(i)}\}$ selected from a first cluster $G_k$, is then registered (for test purposes), for example, in the coordinate system of a second cluster $G_l$. Joining of the clusters $G_m$ can be visualized, for example to show the progress or to get an optional confirmation of the user or to request an optional support by the user.

Figure 2:
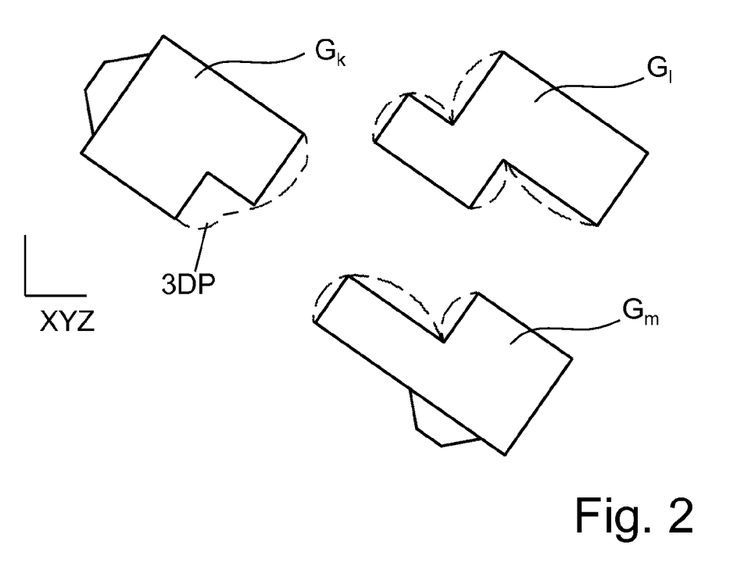
FIG. 2 is a schematic representation of clusters.

A possible first visualization ("correspondence view") is the compressed representation of all clusters $G_m$, side by side, for example on the display unit 24. The expression "side by side" means a spatial adjacent arrangement of the clusters $G_m$ on the display without penetration or overlap of the clusters $G_m$. The visualization tries to use structures and features of the clusters $G_m$ which help the user to recognize the clusters $G_m$. In the case of a building, it is appropriate to select a top view of the clusters $G_m$, corresponding to a floor plan of the building. In FIG. 2 this is shown in an exemplary manner with three clusters $G_k$, $G_l$ and $G_m$, wherein the continuous lines are supposed to represent recognized walls and broken lines the approximate extension of the three-dimensional point cloud 3DP. Updated visualizations show the progress when joining the clusters. That is, once two clusters $G_m$ have been joined, they are visualized in this joined state on the display. Every pair of joined clusters $G_m$ is a partial success. It should be noted that in special cases, e.g., if a cluster $G_m$ extends on two floors of the building, it may helpful to form sub-clusters of said $G_m$, e.g., one sub-cluster in each floor. Each of these sub-clusters may then be displayed side by side with the other clusters $G_m$ of the same floor. Selecting one of the floors, the user may have a top view on all clusters $G_m$ of the selected floor.

Figure 3:
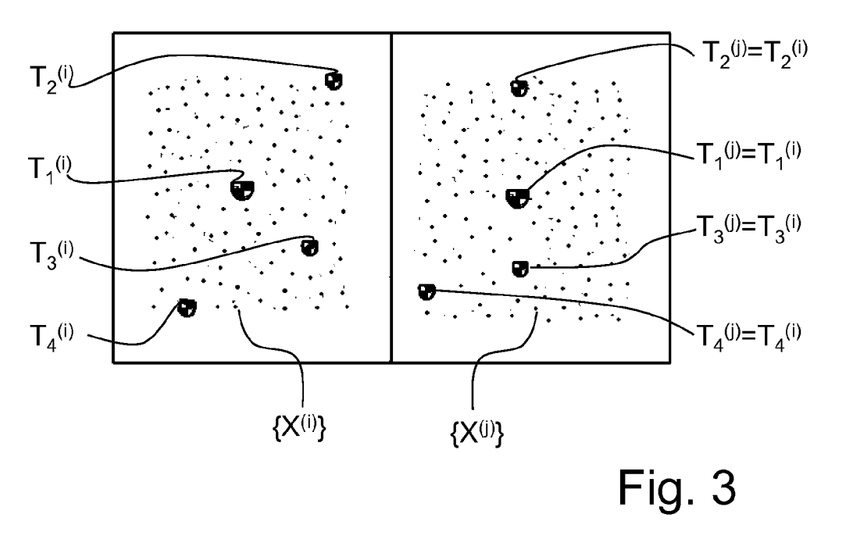
FIG. 3 is a schematic representation of two scans as a split view.

A possible second visualization ("split view") is the representation of the pair of clusters $G_k$, $G_l$ (which are processed at the moment) or of selected scans $\{X^{(i)}\}$, $\{X^{(j)}\}$ from the clusters $G_k$, $G_l$, in a split (screen) view, as shown in FIG. 3. This representation of the two scans $\{X^{(i)}\}$, $\{X^{(j)}\}$ with their targets $T^{(i)}_1$, $T^{(i)}_2$, $T^{(i)}_3$, $T^{(i)}_4$ and $T^{(j)}_1$, $T^{(j)}_2$, $T^{(j)}_3$, $T^{(j)}_4$ is schematic, since the assumed relative rotation would be unproblematic in reality. Both visualizations can also be combined in such a way that a change between them is possible.

Figure 4:
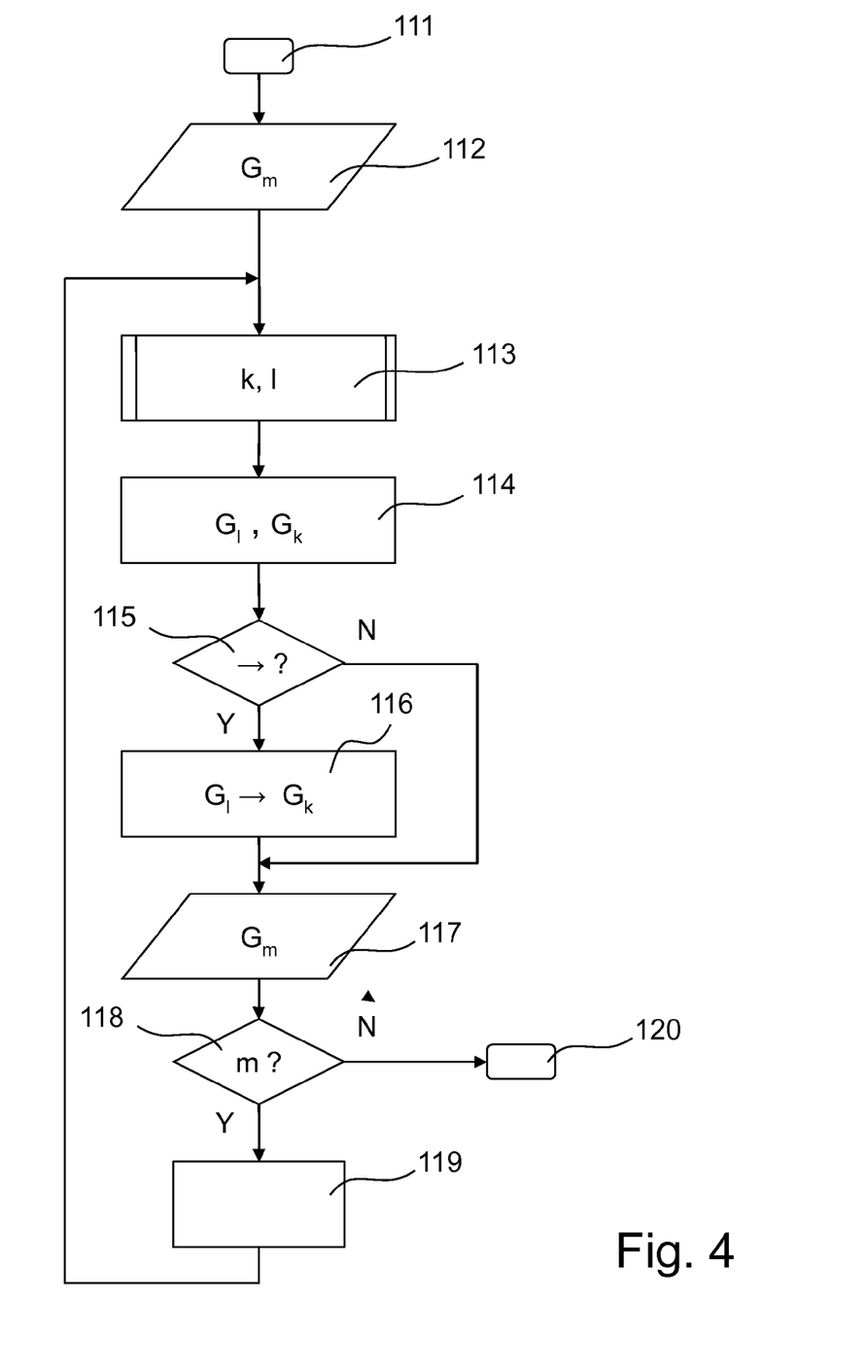
FIG. 4 is a schematic flow diagram of a method of the joining of the clusters.

Joining of the clusters $G_m$ with optional visualization is shown as a flow chart in FIG. 4. After an initial step 111 the above-described visualization takes place in an optional output step 112. In a subprogram 113 which is invoked (and described later), two clusters and each one scan from each of the two clusters are selected, which together build a pair to be registered for test purposes. More precisely, a scan $\{X^{(i)}\}$ is selected from a first cluster $G_k$, such scan being supposed to be registered for test purposes in the coordinate system of a second cluster $G_l$, for which, in turn, a scan $\{X^{(j)}\}$ is selected representatively from this second cluster $G_l$, and the two scans $\{X^{(i)}\}$, $\{X^{(j)}\}$ form the pair.

In a processing step 114 it is tried to register the pair for test purposes—as in processing step 103—and to thus join the clusters. In a decision step 115 it is checked whether such joining has been successful. If this is the case (Y), registering is confirmed in a processing step 116 (corresponding to processing step 105), and optionally a new output step 117, corresponding to output step 112 takes place. Otherwise (N) the two clusters remain separate. In a further decision step 118 (which can be arranged also at another point of the loop) it is checked, whether there are still clusters $G_m$ available, which have not yet been joined, i.e. which are still "free." If this is the case (Y), the loop continues, invoking the subprogram 113, and adding a processing step 119. Otherwise (N) all clusters $G_m$ are joined, so that it is possible to finish with a final step 120. The optional, added processing step 118, which can be carried out also at the beginning of the loop, changes parameters, if all free clusters have already been tested unsuccessfully with a view to joining. In particular, the quality criteria for registering the scans for test purposes can be reduced.

The subprogram 113 with the selection and formation of the pairs can be implemented in different, modified ways.

A first possibility is to strategically select the clusters $G_k$, $G_l$ and the scans $\{X^{(i)}\}$, $\{X^{(j)}\}$ for forming the pairs. If two clusters $G_k$, $G_l$, which are consecutive regarding their time stamp are selected, then multiple scans $\{X^{(i)}\}$ from a first cluster $G_k$ can be selected consecutively (e.g., each time the subprogram 113 is invoked) to form pairs with the first scan $\{X^{(j)}\}$ of the second cluster $G_l$ which is later—with a view to the time stamp. If appropriate, only the last scan $\{X^{(i)}\}$ is selected from the first cluster $G_k$. Again, the first cluster $G_k$ and the second cluster $G_l$ may be selected as a whole or peripheral regions of the two clusters $G_k$, $G_l$ may be selected. Or the pair is formed by the whole (or peripheral portion of the) first cluster $G_k$ on one hand and the first scan $\{X^{(j)}\}$ of the second cluster $G_l$ on the other hand. It then proceeds on the assumption that the first cluster $G_k$ will come to a dead end and that the second cluster G, branches at an earlier point which, due to the defined limit with respect to space and/or time in decision step 106, has not yet been checked. Within the strategy, the limit is repealed. Further strategies are possible. In case of a building, a further strategy may be to distinguish clusters $G_k$, $G_l$ by floors. The floors may be detected by an altimeter, e.g., being a built-in sensor of the 3D measurement device.

Since some of the pairs have already been tested unsuccessfully once (which is appropriate to be noted), the processing step 118 with the modified parameters can be helpful.

Such implementation of the subprogram 113 (with strategic selection) provides a completely automatic method for selecting the clusters $G_k$, $G_l$ and the scans $\{X^{(i)}\}$, $\{X^{(j)}\}$. Modifying the parameters may comprise a reduction of the quality criteria. As subprogram 113 is inside a loop, the reduction will be iterative. With reduced quality criteria, a final confirmation by the user becomes appropriate, however.

A second possibility is to assume a support by the user in subprogram 113, i.e., a semi-automatic method for joining the clusters $G_m$.

In the case of the first visualization with the clusters side by side (FIG. 2), the user can shift the clusters relative to each other by an appropriate input unit, for example a mouse. The user shifts, for example cluster $G_l$ to cluster $G_k$, so that the point clouds overlap. With the information gained from the input and output units, the concerned cluster $G_k$ and cluster $G_l$ can be set in a spatial relationship to each other, and the appropriate scans can be selected therefrom. Since the corresponding targets are in immediate vicinity to each other, registering for test purposes in processing step 114 will then soon be successful.

In the case of the second visualization in a split view, FIG. 3 shows the two scans on the left and on the right. The targets $T^{(i)}_1$, $T^{(i)}_2$, $T^{(i)}_3$, $T^{(i)}_4$ of the scan represented on the left $\{X^{(i)}\}$ are supposed to correspond with the targets $T^{(j)}_1$, $T^{(j)}_2$, $T^{(j)}_3$, $T^{(j)}_4$ of the scan $\{X^{(j)}\}$ represented on the right. The user can provide for this correspondence by an appropriate input unit, for example a mouse or a touchscreen. At first it is tried to carry out registering for test purposes with two pairs of such corresponding targets, for example $T^{(i)}_1$ und $T^{(j)}_1$ as well as $T^{(i)}_2$ and $T^{(j)}_2$ in processing step 114. With each further invoking of subprogram 113, a further pair of corresponding targets would be called.

A third possibility exists in the case of an onsite registration. For this purpose, the scans $\{X^{(i)}\}$ are registered, i.e., joined to a cluster, already while the scene is still being registered (i.e. scanned and measured optically), i.e., as long as the user with laser scanner 10 is still on site. Registering may take place between two scans when the color camera 25 is used. Optionally, the laser scanner 10 allows for the next (regular) scan $\{X^{(i)}\}$ only when a registering of the scans made until now has been successful.

If the previous cluster shall be terminated and a new cluster is started, i.e., if registering for test purpose has been unsuccessful, subprogram 113 can request the user to generate at least one additional (extraordinary) scan $\{X^{(j)}\}$, usually in the area scanned last, from which the cluster which has just been terminated and the cluster which has been started (i.e., the unsuccessfully joined clusters) come, and which can be visualized to the user in a contemporary way. The later the call for the additional scan $\{X^{(j)}\}$ takes place, the more difficult is it for the user to find the correct area with the unsuccessfully joined clusters.

The pairs are formed from the additional scan $\{X^{(j)}\}$ and from selected, available scans $\{X^{(i)}\}$ of the cluster which has just been terminated. Selection can again take place strategically (and automatically), as in the first possibility of implementing subprogram 113. When the terminated cluster has been successfully complemented with the additional scan, it is tried to join the terminated cluster and the cluster which has just been started. If appropriate, a further call for an additional scan takes place.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method for optically scanning and measuring a scene by a three-dimensional (3D) measurement device in which multiple scans are generated by the device, and the multiple scans are then registered in a joint coordinate system of the scene, comprising:
   generating at least one cluster from at least one scan of the multiple of scans;
   registering additional scans from the multiple of scans for test purposes in a coordinate system of the generated at least one cluster;
   confirming the registering of the additional scans if specified quality criteria are fulfilled; and
   joining clusters generated from the additional scans by selecting at least two scans and/or clusters to form pairs and registering the pairs for test purposes and confirming the registering.

2. The method of claim 1, wherein the selecting of at least two scans is performed by one of the group consisting of automatically, by a user or by generating an additional scan.

3. The method of claim 1, wherein the clusters generated from the additional scans are generated by using a limit that is defined for the scans to be registered for test purposes, and the limit is repealed in the case of a selection of the scans and/or the clusters for forming the pairs.

4. The method of claim 1, wherein quality criteria are used when joining the clusters.

5. The method of claim 1, wherein the at least two scans selected from the clusters are visualized from the clusters for producing correspondence between targets of the selected at least two scans.

6. The method of claim 1, wherein during registering of the multiple scans in the joint coordinate system of the scene, a cluster is generated from an additional scan and a registering for test purposes in a coordinate system of the generated cluster takes place and a next scan is generated only after a confirmation of the registering of the pairs for test purposes occurs.

7. The method of claim 6, wherein after an unsuccessful registering of the pairs for test purposes, and additional scan takes place.

8. The method of claim 1, wherein registering the pairs for test purposes takes place automatically using targets in overlapping areas of the scans.

9. A three-dimensional (3D) measurement device for carrying out the method of claim 1, comprising a control and evaluation unit which determines, for a plurality of measuring points of every one of the scans at least a distance from the a center of the 3D measurement device to the object and registers the generated scans in a joint coordinate system of the scene, wherein the center of the laser scanner rests while a scan is made and is movable between the scans.

10. The 3D measurement device of claim 9, configured as a laser scanner comprising a base, a measuring head which is rotatable with regard to the base, a light emitter which emits an emission light beam, a light receiver which receives a reception light beam which is reflected by an object in the environment of the laser scanner or scattered otherwise, wherein the center of the 3D measurement device rests while a scan is made and is movable between the scans.

* * * * *